US011250699B2

(12) United States Patent
Malkes et al.

(10) Patent No.: US 11,250,699 B2
(45) Date of Patent: Feb. 15, 2022

(54) SYSTEM AND METHOD OF ADAPTIVE TRAFFIC MANAGEMENT AT AN INTERSECTION

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 89 days.

(21) Appl. No.: 16/100,750

(22) Filed: Aug. 10, 2018

(65) Prior Publication Data

US 2019/0051167 A1 Feb. 14, 2019

Related U.S. Application Data

(60) Provisional application No. 62/545,279, filed on Aug. 14, 2017.

(51) Int. Cl.
G08G 1/08 (2006.01)
G08G 1/01 (2006.01)
(Continued)

(52) U.S. Cl.
CPC ............... *G08G 1/08* (2013.01); *G06N 5/025* (2013.01); *G08G 1/005* (2013.01); *G08G 1/0116* (2013.01);
(Continued)

(58) Field of Classification Search
CPC ....... G08G 1/096716; G08G 1/096741; G08G 1/096775; G08G 1/20; G08G 1/08;
(Continued)

(56) References Cited

U.S. PATENT DOCUMENTS 4,833,469 A 5/1989 David
5,111,401 A 5/1992 Everette et al.
(Continued)

FOREIGN PATENT DOCUMENTS

CN 100533151 8/2009
CN 101799987 8/2010
(Continued)

OTHER PUBLICATIONS

U.S. Appl. No. 16/030,396 Office Action dated Nov. 20, 2018.
(Continued)

*Primary Examiner* — Hai Phan
*Assistant Examiner* — Anthony D Afrifa-Kyei
(74) *Attorney, Agent, or Firm* — Kilpatrick Townsend & Stockton, LLP

(57) ABSTRACT

A traffic control system and a method of automatic zone creation and modification for a smart traffic camera to be used in adaptive traffic management at an intersection are disclosed. One aspect of the present disclosure is a method including applying default zone parameters to define detection zones at one or more sensors installed at an intersection, the detection zones being used by the one or more sensors for monitoring and detecting traffic conditions at the intersection; determining a current vehicular traffic flow rate and a current pedestrian traffic flow rate at the intersection; determining if a triggering condition for adjusting one or more of the default zone parameters; and adjusting the one or more of the default zone parameters if the triggering condition is met.

20 Claims, 10 Drawing Sheets

(51) Int. Cl.
  *G08G 1/04* (2006.01)
  *G08G 1/005* (2006.01)
  *G06N 5/02* (2006.01)
  *G06N 20/00* (2019.01)

(52) U.S. Cl.
  CPC ......... *G08G 1/0133* (2013.01); *G08G 1/0145* (2013.01); *G08G 1/04* (2013.01); *G06N 20/00* (2019.01)

(58) Field of Classification Search
  CPC .... G08G 1/005; G08G 1/0116; G08G 1/0133; G08G 1/0145; G08G 1/04; G01C 21/3415; G01C 21/3691; G07C 5/008; G07C 5/085; G06N 5/025; G06N 20/00
  See application file for complete search history.

(56) References Cited

U.S. PATENT DOCUMENTS

| | | |
|---|---|---|
| 5,208,584 A | 5/1993 | Kaye et al. |
| 5,406,490 A | 4/1995 | Braegas |
| 5,444,442 A | 8/1995 | Sadakata et al. |
| 6,064,139 A | 5/2000 | Ozawa et al. |
| 6,075,874 A | 6/2000 | Higashikubo et al. |
| 6,249,241 B1 | 6/2001 | Jordan et al. |
| 6,317,058 B1 | 11/2001 | Lemelson et al. |
| 6,366,219 B1 | 4/2002 | Hoummady |
| 6,405,132 B1 | 6/2002 | Breed et al. |
| 6,505,046 B1 | 1/2003 | Baker |
| 6,526,352 B1 | 2/2003 | Breed et al. |
| 6,720,920 B2 | 4/2004 | Breed et al. |
| 6,741,926 B1 | 5/2004 | Zhao et al. |
| 6,751,552 B1 | 6/2004 | Minelli |
| 6,768,944 B2 | 7/2004 | Breed et al. |
| 6,862,524 B1 | 3/2005 | Nagda et al. |
| 6,937,161 B2 | 8/2005 | Nishimura |
| 7,110,880 B2 | 9/2006 | Breed et al. |
| 7,610,146 B2 | 10/2009 | Breed |
| 7,630,806 B2 | 12/2009 | Breed |
| 7,698,055 B2 | 4/2010 | Horvitz et al. |
| 7,698,062 B1 | 4/2010 | McMullen et al. |
| 7,821,421 B2 | 10/2010 | Tamir et al. |
| 7,835,859 B2 | 11/2010 | Bill |
| 7,899,611 B2 | 3/2011 | Downs et al. |
| 7,979,172 B2 | 7/2011 | Breed |
| 8,050,863 B2 | 11/2011 | Trepagnier et al. |
| 8,135,505 B2 | 3/2012 | Vengroff et al. |
| 8,144,947 B2 | 3/2012 | Kletter |
| 8,212,688 B2 | 7/2012 | Morioka et al. |
| 8,255,144 B2 | 8/2012 | Breed et al. |
| 8,373,582 B2 | 2/2013 | Hoffberg |
| 8,566,029 B1 | 10/2013 | Lopatenko et al. |
| 8,589,069 B1 | 11/2013 | Lehman |
| 8,682,812 B1 | 3/2014 | Ran |
| 8,706,394 B2 | 4/2014 | Trepagnier et al. |
| 8,825,350 B1 | 9/2014 | Robinson |
| 8,903,128 B2 | 12/2014 | Shet et al. |
| 9,043,143 B2 | 5/2015 | Han |
| 9,387,928 B1 | 7/2016 | Gentry et al. |
| 9,418,546 B1* | 8/2016 | Whiting ............. G06K 9/00771 |
| 9,720,412 B1* | 8/2017 | Zhu ....................... B60W 30/00 |
| 9,965,951 B1* | 5/2018 | Gallagher ............ G08G 1/0133 |
| 2004/0155811 A1 | 8/2004 | Albero et al. |
| 2005/0187708 A1 | 8/2005 | Joe et al. |
| 2007/0162372 A1 | 7/2007 | Anas |
| 2007/0208494 A1 | 9/2007 | Chapman et al. |
| 2007/0273552 A1 | 11/2007 | Tischer |
| 2008/0094250 A1 | 4/2008 | Myr |
| 2008/0195257 A1 | 8/2008 | Rauch |
| 2009/0048750 A1 | 2/2009 | Breed |
| 2009/0051568 A1 | 2/2009 | Corry et al. |
| 2011/0037618 A1 | 2/2011 | Ginsberg et al. |
| 2011/0205086 A1 | 8/2011 | Lamprecht et al. |
| 2012/0038490 A1 | 2/2012 | Verfuerth |
| 2012/0112928 A1 | 5/2012 | Nishimura et al. |
| 2012/0307065 A1 | 12/2012 | Mimeault et al. |
| 2013/0048795 A1* | 2/2013 | Cross .................... B61L 25/025 246/122 R |
| 2014/0136414 A1 | 5/2014 | Abhyanker |
| 2014/0159925 A1 | 6/2014 | Mimeault et al. |
| 2014/0277986 A1 | 9/2014 | Mahler et al. |
| 2016/0027299 A1* | 1/2016 | Raamot .................... G08G 1/08 340/917 |
| 2016/0225259 A1* | 8/2016 | Harris .................... H04W 4/029 |
| 2017/0169309 A1 | 6/2017 | Reddy et al. |
| 2018/0004210 A1* | 1/2018 | Iagnemma ......... G01C 21/3407 |
| 2018/0075739 A1 | 3/2018 | Ginsberg et al. |
| 2019/0049264 A1 | 2/2019 | Malkes |
| 2019/0050647 A1 | 2/2019 | Malkes |
| 2019/0051152 A1 | 2/2019 | Malkes |
| 2019/0051160 A1 | 2/2019 | Malkes |
| 2019/0051161 A1 | 2/2019 | Malkes |
| 2019/0051162 A1 | 2/2019 | Malkes |
| 2019/0051163 A1 | 2/2019 | Malkes |
| 2019/0051164 A1 | 2/2019 | Malkes |
| 2019/0051171 A1 | 2/2019 | Malkes |

FOREIGN PATENT DOCUMENTS

| | | |
|---|---|---|
| CN | 101944295 | 1/2011 |
| EP | 0 464 821 | 1/1992 |
| KR | 2013-0067847 | 6/2013 |

OTHER PUBLICATIONS

U.S. Appl. No. 16/058,343 Office Action dated Nov. 19, 2018.
Dehghan et al., Afshin; "Automatic Detection and Tracking of Pedestrians in Videos with Various Crowd Densities", Pedestrian and Evacuation Dynamics 2012.
Dubska et al.; "Automatic Camera Calibration for Traffic Understanding", bmva.org, 2014.
Grosser, Kari; "Smart Io T Technologies for Adaptive Traffic Management Using a Wireless Mes Sensor Network", Advantech Industrial Io T Blog, Feb. 3, 2017.
https://www.flir.com, 2018.
Halper, Mark; Smart Cameras Will Help Spokane Light It's World More Intelligently (Updated), LEDs Magazine, and Business/Energy/Technology Journalist, Apr. 19, 2017.
Heaton, Brian; "Smart Traffic Signals Get a Green Light", Government Technology Magazine, Feb. 15, 2012.
Kolodny, Lora; Luminar reveals sensors that could make self-driving cars safer than human, Techcrunch, Apr. 13, 2017.
McDermott, John; "Google's newest secret weaon for local ads", Digiday, Jan. 29, 2014.
Resnick, Jim; "How Smart Traffic Signals May Ease Your Commute", BBC, Autos, Mar. 18, 2015.
Sun et al., M.; "Relating Things and Stuff via Object Property Interactions", cvgl.stanford.edu, Sep. 4, 2012.
Whitwam, Ryan; "How Google's self-driving cars detect and avoid obstacles", ExtremeTech, Sep. 8, 2014.
Yamaguchi, Jun'ichi; "Three Dimensional Measurement Using Fisheye Stereo Vision", Advances in Theory and Applications of Stereo Vision, Dr. Asim Bhatti (Ed.), ISBN:978-953-307-516-7, InTech. Jan. 8, 2011.
U.S. Appl. No. 16/030,396, William A. Malkes, System and Method Adaptive Controlling of Traffic Using Camera Data, Jul. 9, 2018.
U.S. Appl. No. 16/044,891, William A. Malkes, System and Method for Controlling Vehicular Traffic, Jul. 25, 2018.
U.S. Appl. No. 16/032,886, William A. Malkes, Adaptive Traffic Control Using Object Tracking and Identity Details, Jul. 11, 2018.
U.S. Appl. No. 16/058,106, William A. Malkes, System and Method for Managing Traffic by Providing Recommendations to Connected Objects, Aug. 8, 2018.
U.S. Appl. No. 16/059,814, William A. Malkes, Systems and Methods of Navigating Vehicles, Aug. 9, 2018.
U.S. Appl. No. 16/059,886, William A. Malkes, System and Method of Adaptive Traffic Optimization Using Unmanned Aerial Vehicles, Aug. 9, 2018.

(56) References Cited

OTHER PUBLICATIONS

U.S. Appl. No. 16/058,214, William A. Malkes, System and Method of Adaptive Traffic Management at an Intersection, Aug. 8, 2018.
U.S. Appl. No. 16/101,766, William A. Malkes, System and Method for Retail Revenue Based Traffic Management, Aug. 10, 2018.
U.S. Appl. No. 16/101,933, William A. Malkes, Adaptive Optimization of Navigational Routes Using Traffic Data, Aug. 13, 2018.
U.S. Appl. No. 16/058,343, William A. Malkes, System and Method of Adaptive Controlling of Traffic Using Zone Based Occupancy, Aug. 8, 2018.

* cited by examiner

| Intersection A | | | |
|---|---|---|---|
| Zone Label | Zone coordinates (x,y) | Width x Length (ft) | Settings Label |
| Zone 1a | 2, 0 | 6 x 15 | Default |
| Zone 1b | 3, 1.5 | 6 x 10 | Default |
| Pedestrian Zone 1 | -2, 1.5 | 5 x 10 | Default |
| Zone 2a | -0.5, 5.5 | 6 x 12 | Default |
| Zone 2b | 1, 5.5 | 6 x 12 | Default |
| Pedestrian Zone 2 | 2, 2 | 5 x 10 | Default |
| ... | ... | ... | ... |
| Zone N | X, Y | W x L | Default |
| Zone 1a | 2, 0 | 6 x 40 | Extended Zone |
| Zone 1b | 3, 1.5 | 6 x 30 | Extended Zone |
| Zone 2a | -0.5, 5.5 | 6 x 50 | Extended Zone |
| ... | ... | ... | ... |

| Time Interval | Zone 1a Traffic Flow Rate (Vehicle/Min.) | Zone 1b Traffic Flow Rate (Vehicle/Min.) | Zone 2a Traffic Flow Rate (Vehicle/Min.) | Zone 2b Traffic Flow Rate (Vehicle/Min.) | Zone N Traffic Flow Rate (Vehicle/Min.) | Pedestrian Zone 1 Count | Pedestrian Zone 2 Count | Pedestrian Zone N Count |
|---|---|---|---|---|---|---|---|---|
| 1 | 10 | 15 | 11 | 11 | : | 12 | 12 | : |
| 2 | 10 | 14 | 11 | 11 | : | 12 | 12 | : |
| 3 | 10 | 15 | 11 | 11 | : | 12 | 12 | : |
| 4 | 10 | 14 | 9 | 9 | : | 0 | 0 | : |
| 5 | 11 | 15 | 11 | 11 | : | 0 | 0 | : |
| 6 | 10 | 15 | 11 | 11 | : | 0 | 0 | : |
| 7 | 12 | 15 | 11 | 11 | : | 0 | 0 | : |
| 11 | 12 | 14 | 11 | 11 | : | 0 | 0 | : |
| 12 | 10 | 14 | 11 | 11 | : | 8 | 8 | : |
| 13 | 10 | 14 | 11 | 11 | : | 11 | 11 | : |

Figure 7

| IF traffic flow rate is | At Zone | AND Pedestrian Zone Activity | Pedestrian Zone | Rules Settings |
|---|---|---|---|---|
| >10 | 1a | >10 | 1 | Extend Zones |
| >12 | 1b | >10 | 1 | Extend Zones |
| >11 | 2a | >10 | 2 | Extend Zones |
| >15 | 2b | >10 | 2 | Extend Zones |
| ... | ... | ... | ... | ... |
| >10 | $N_n$ | >10 | N | Extend Zones |

900

SYSTEM AND METHOD OF ADAPTIVE TRAFFIC MANAGEMENT AT AN INTERSECTION

CROSS-REFERENCE TO RELATED APPLICATIONS

This application claims priority to U.S. Provisional Patent Application No. 62/545,279 filed on Aug. 14, 2017, the entire content of which is incorporated herein by reference.

BACKGROUND

Field of the Disclosure

The present disclosure is generally related to adaptive traffic management and more particularly to adaptive zone detection for use in adaptive traffic management, where the adaptive zone detection is based on pedestrian and object traffic at an intersection.

Description of the Related Art

Pedestrians usually suffer from severe injuries when they are involved in accidents with motor objects. Pedestrian accidents occur while people are on sidewalks, stepping off curbs, leaving buses or taxis, walking though parking lots, jogging down the street, or standing on roadsides. According to a recent report by the National Highway Transportation Safety Administration (NHTSA), 4,432 pedestrians were killed and another 69,000 pedestrians injured on public streets and roadways in the United States in 2011. On average, one crash-related pedestrian death occurred every two hours, and an injury every eight minutes. More than one-third of those accidents occurred on crosswalks.

Crosswalks are often insufficiently marked and lack proper lighting, stop signs, or other warnings signs to alert drivers well in advance to slow down. Historically, intersections are designed focusing more on moving traffic efficiently rather than on the safety of pedestrians. In addition to poorly designed or maintained crosswalks, a significant number of pedestrian accidents are caused by drivers who are inexperienced, distracted, and, in many cases, speeding over the legal limits.

Thus, an improved traffic optimization system is required that could help improve pedestrian safety at crosswalks.

SUMMARY

In a first claimed embodiment, a method of automatic zone creation and modification includes applying default zone parameters to define detection zones at one or more sensors installed at an intersection where the detection zones are used by the one or more sensors for monitoring and detecting traffic conditions at the intersection. The method further includes determining a current vehicular traffic flow rate and a current pedestrian traffic flow rate at the intersection, determining if a triggering condition for adjusting one or more of the default zone parameters and adjusting the one or more of the default zone parameters if the triggering condition is met.

In a second claimed embodiment, a controller includes a memory with computer-readable instructions therein and one or more processors configured to execute the computer-readable instructions to apply default zone parameters to define detection zones at one or more sensors installed at an intersection, where the detection zones are used by the one or more sensors for monitoring and detecting traffic conditions at the intersection; determine a current vehicular traffic flow rate and a current pedestrian traffic flow rate at the intersection; determine if a triggering condition for adjusting one or more of the default zone parameters; and adjust the one or more of the default zone parameters if the triggering condition is met.

In a third claimed embodiment, one or more non-transitory computer-readable medium have computer-readable instructions stored therein that can be executed by one or more processors of a controller for the controller to apply default zone parameters to define detection zones at one or more sensors installed at an intersection, where the detection zones are used by the one or more sensors for monitoring and detecting traffic conditions at the intersection; determine a current vehicular traffic flow rate and a current pedestrian traffic flow rate at the intersection; determine if a triggering condition for adjusting one or more of the default zone parameters; and adjust the one or more of the default zone parameters if the triggering condition is met.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 7 illustrates an example table of data derived from tracking and ID analysis of FIG. 6;

DETAILED DESCRIPTION

Adaptive traffic management relies, in part, on proper detection of traffic conditions (number and types of objects, traffic flow rates, etc.), at an intersection in real time to adjust, also in real time, traffic control parameters such as signal durations to respond to the changed traffic conditions. The proper detection of traffic conditions at an intersection is made possible by using various types of smart cameras, sensors, etc.

Performance of a smart camera to better detect objects and traffic conditions improves as its zone detection and modification capabilities improve. In one aspect, such zone detection and modification capabilities can be improved but taking into consideration not only the vehicular traffic conditions at an intersection but also pedestrian traffic conditions and correlations thereof with vehicular traffic conditions.

Hereinafter, examples will be described for improving zone identification and detection for smart traffic cameras based on vehicular and pedestrian traffic conditions. The disclosure begins with a description of an example system.

Figure 1:
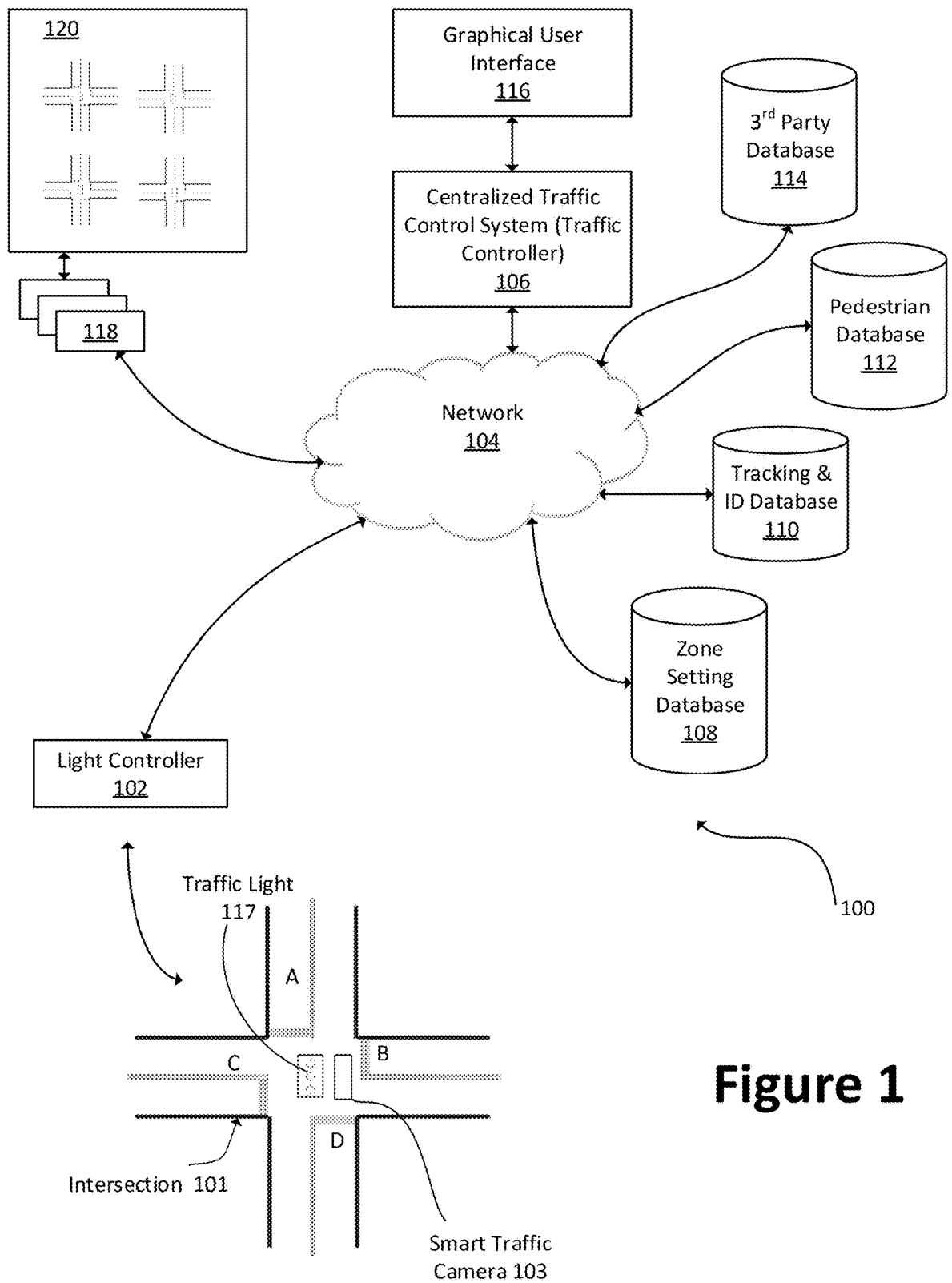
FIG. 1 illustrates a system for adaptive controlling of traffic.

FIG. 1 illustrates a system for adaptive controlling of traffic. The system 100 comprises various components including but not limited to, a traffic light controller 102 (hereinafter may be referred to as a light controller 102) associated with a smart traffic camera 103 and traffic light 117 installed at an intersection 101. Components of the traffic controller 106 will be further described with reference to FIG. 2. The traffic controller 106 may or may not be physically located near the smart traffic camera 103 or the traffic light 117. In one example embodiment, the traffic light 117 associated with the light controller 102 can have different traffic signals directed towards all the roads/zones leading to the intersection 101. The different signals may comprise a Red light, a Yellow light, and a Green light.

There may be more than one smart traffic camera 103 or one traffic light 117 installed at intersection 101. The smart traffic camera 103 may be one of various types of cameras, including but not limited to, fisheye traffic cameras to detect and optimize traffic flows at the intersection 101 and/or at other intersections part of the same local network or corridor. The smart traffic camera 103 can be any combination of cameras or optical sensors, such as but not limited to fish-eye cameras, directional cameras, infrared cameras, etc. The smart traffic camera 103 can allow for other types of sensors to be connected to thereto (e.g., via various known or to be developed wired and/or wireless communication schemes) for additional data collection. The smart traffic camera 103 can collect video and other sensor data at the intersection 101 and convey the same to the traffic controller 106 for further processing, as will be described below.

The light controller 102 can manage and control traffic for all zones (directions) at which traffic enters and exits the intersection 101. Examples of different zones of the intersection 101 are illustrated in FIG. 1 (e.g., zones A, B, C and D). Therefore, while FIG. 1 only depicts a single smart traffic camera 103 and a single traffic light 117, there can be multiple ones of the smart traffic camera 103 and traffic lights 117 installed at the intersection 101 for managing traffic for different zones of the intersection 101.

The system 100 may further include network 104. The network 104 can enable the light controller 102 to communicate with a remote traffic control system 106 (which may be referred to as a centralized traffic control system or simply a traffic controller 106). The network 104 can be any known or to be developed cellular, wireless access network and/or a local area network that enables communication (wired or wireless) among components of the system 100. As mentioned above, the light controller 102 and the traffic controller 106 can communicate via the network 104 to exchange data, created traffic rules or control settings, etc., as will be described below.

The traffic controller 106 can be a centralized system used for managing and controlling traffic lights and conditions at multiple intersections (in a given locality, neighbourhood, an entire town, city, state, etc.).

The traffic controller 106 can be communicatively coupled (e.g., via any known or to be developed wired and/or wireless network connection such as network 104) to one or more databases such as a zone setting database 108, a tracking and ID database 110, a pedestrian database 112 and a $3^{rd}$ party database 114.

The zone setting database 108 may be configured to store settings for vehicular zones and pedestrian zones, as will be described below. The tracking and ID database 110 may be configured to store identity of detected objects (e.g., vehicles) and pedestrians determined by traffic controller 106, as will be described below. The pedestrian database 112 may be configured to store machine-learning based rules created for zone detection and modification using detected pedestrian traffic and correlation thereof with vehicular traffic. Finally, the $3^{rd}$ party database 114 may be configured to store additional contextual data to be used for zone identification and detection including, but not limited to, information about mobile devices carried by detected pedestrians, distances of such devices to respective pedestrians, scheduled nearby public events or events and nearby points of interest, etc. In one example, $3^{rd}$ party database 114 can be provided by a $3^{rd}$ party and can be publicly or privately (subscription based) accessible to traffic controller 106.

The traffic controller 106 can provide a centralized platform for network operators to view and manage traffic conditions, set traffic control parameters and/or manually override any traffic control mechanisms at any given intersection. An operator can access and use the traffic controller 106 via a corresponding graphical user interface 116 after providing login credentials and authentication of the same by the traffic controller 106. The traffic controller 106 can be controlled, via the graphical user interface 116, by an operator to receive traffic control settings and parameters to apply to one or more designated intersections. The traffic controller 106 can also perform automated and adaptive control of traffic at the intersection 101 or any other associated intersection based on analysis of traffic conditions, data and statistics at a given intersection(s) using various algorithms and computer-readable programs such as known or to be developed machine learning algorithms. The components and operations of traffic controller 106 will be further described below.

Traffic controller 106 can be a cloud based component running on a public, private and/or a hybrid cloud service/infrastructure provided by one or more cloud service providers.

The system 100 can also have additional intersections and corresponding light controllers associated therewith. Accordingly, not only the traffic controller 106 is capable of adaptively controlling the traffic at an intersection based on traffic data at that particular intersection but it can further adapt traffic control parameters for that particular intersection based on traffic data and statistics at nearby intersections communicatively coupled to the traffic controller 106.

As shown in FIG. 1, the light controllers 118 can be associated with one or more traffic lights at one or more of the intersections 120 and can function in a similar manner as the light controller 102 and receive anomaly rules and traffic control settings from the traffic controller 106 for managing traffic at the corresponding one of intersections 120. Alternatively, any one of the light controllers 118 can be a conventional light controller implementing pre-set traffic control settings at the corresponding traffic lights but configured to convey corresponding traffic statistics to the traffic controller 106.

The intersections 120 can be any number of intersections adjacent to the intersection 101, within the same neighbourhood or city as the intersection 101, intersections in another city, etc.

In one or more examples, the light controller 102 and the traffic controller 106 can be the same (one component implementing the functionalities of both). In such example, components of each described below with reference to FIGS. 2 and 3 may be combined into one. Furthermore, in such example, the light controller 102 may be remotely located relative to the smart traffic camera 103 and the traffic light 117 and be communicatively coupled thereto over a communication network such as the network 104.

As mentioned above, the components of the system 100 can communicate with one another using any known or to be developed wired and/or wireless network. For example, for wireless communication, techniques such as Visible Light Communication (VLC), Worldwide Interoperability for Microwave Access (WiMAX), Long Term Evolution (LTE), Fifth Generation (5G) cellular, Wireless Local Area Network (WLAN), Infrared (IR) communication, Public Switched Telephone Network (PSTN), Radio waves, and other communication techniques known, or to be developed, in the art may be utilized.

While certain components of the system 100 are illustrated in FIG. 1, inventive concepts are not limited thereto and the system 100 may include any number of additional components necessary for operation and functionality thereof.

Having described components of the system 100 as an example, the disclosure now turns to description of one or more examples of components of the light controller 102 and the traffic controller 106.

Figure 2:
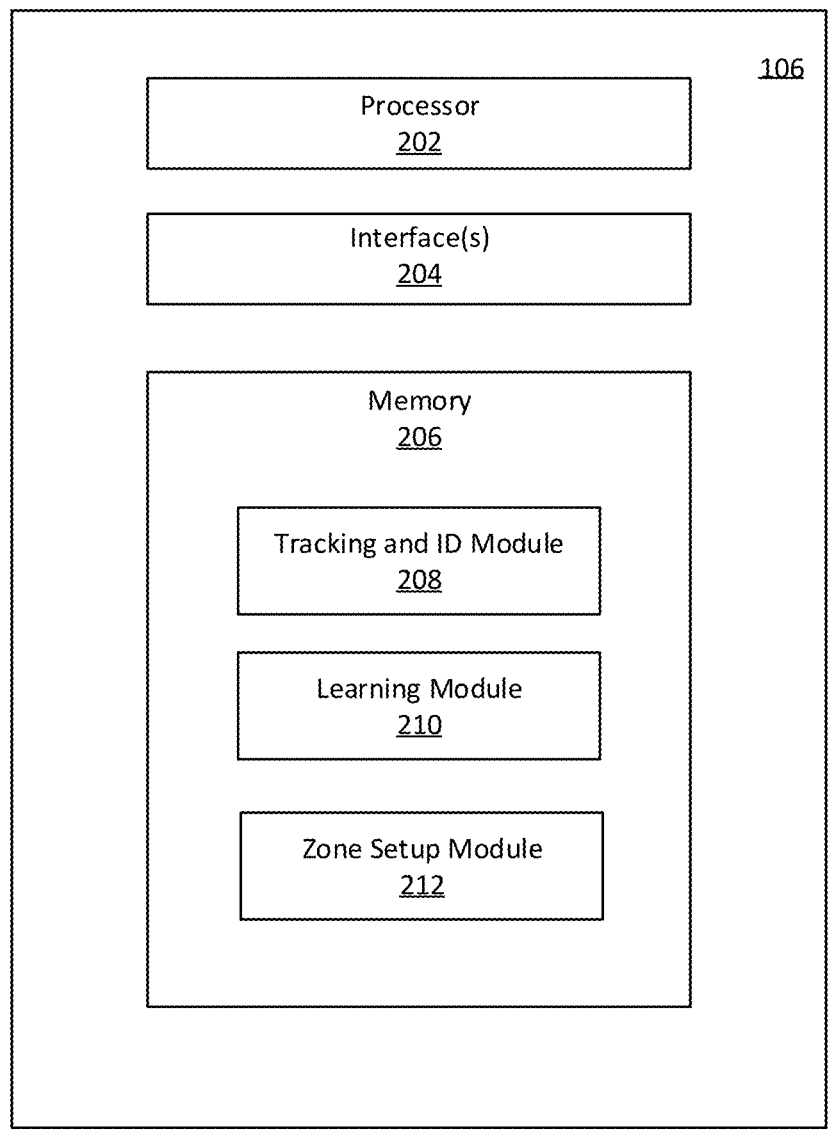
FIG. 2 is a block diagram showing different components of the traffic controller of FIG. 1.

FIG. 2 is a block diagram showing different components of the traffic controller of FIG. 1. The traffic controller 106 can comprise one or more processors such as a processor 202, interface(s) 204 and one or more memories such as a memory 206. The processor 202 may execute an algorithm stored in the memory 206 for adaptive traffic control based on detection of anomalies, as will be described below. The processor 202 may also be configured to decode and execute any instructions received from one or more other electronic devices or server(s). The processor 202 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 202 may be configured to execute one or more computer-readable program instructions, such as program instructions to carry out any of the functions described in this description.

The interface(s) 204 may assist an operator in interacting with the traffic controller 106. The interface(s) 204 of the traffic controller 106 can be used instead of or in addition to the graphical user interface 116 described above with reference to FIG. 1. In another example, the interface(s) 204 can be the same as the graphical user interface 116. The interface(s) 204 either accept an input from the operator or provide an output to the operator, or may perform both the actions. The interface(s) 204 may either be a Command Line Interface (CLI), Graphical User Interface (GUI), voice interface, and/or any other user interface known in the art or to be developed.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 may include computer-readable instructions, which when executed by the processor 202 cause the traffic controller 106 to perform dynamic detection zone creation and modification for adaptive traffic control. The computer-readable instructions stored in the memory 206 can be identified as tracking and ID module (service) 208, learning module (service) 210 and zone setup module (service) 212. The functionalities of each of these modules, when executed by the processor 202 will be further described below.

Figure 3:
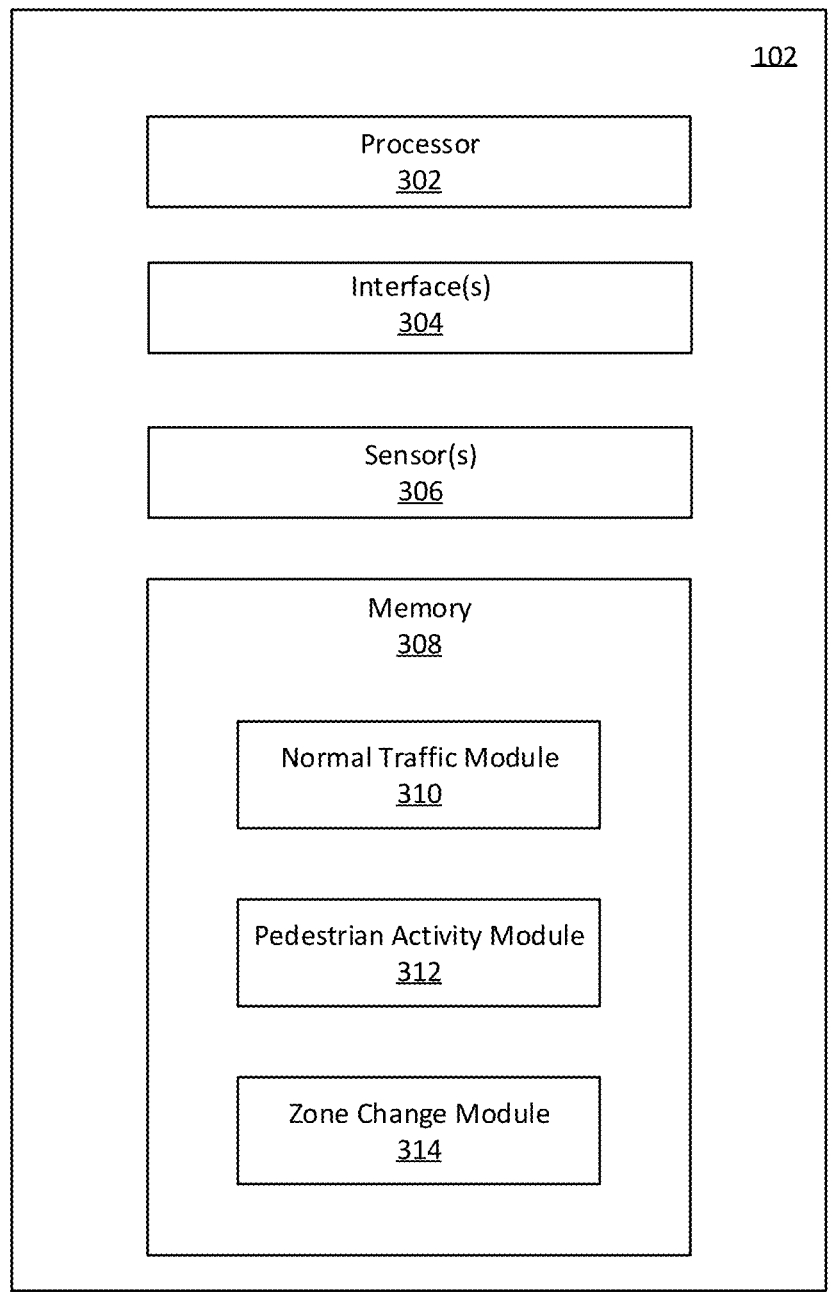
FIG. 3 is a block diagram showing different components of the light controller of FIG. 1.

FIG. 3 is a block diagram showing different components of the light controller of FIG. 1. As mentioned above, the light controller 102 can be physically located near the smart traffic camera 103 and/or the traffic light 117 (e.g., at a corner of the intersection 101) or alternatively can communicate with the smart traffic camera 103 and/or the traffic light 117 wirelessly or via a wired communication scheme (be communicatively coupled thereto).

The light controller 102 can comprise one or more processors such as a processor 302, interface(s) 304, sensor(s) 306, and one or more memories such as a memory 308. The processor 302 may execute an algorithm stored in the memory 308 for adaptive traffic control, as will be described below. The processor 302 may also be configured to decode and execute any instructions received from one or more other electronic devices or server(s). The processor 302 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 302 may be configured to execute one or more computer-readable program instructions, such as program instructions to carry out any of the functions described in this description.

The interface(s) 304 may assist an operator in interacting with the light controller 102. The interface(s) 304 of the light controller 102 may be used instead of or in addition to the graphical user interface 116 described with reference to FIG. 1. In one example, the interface(s) 304 can be the same as the graphical user interface 116. The interface(s) 304 either accept an input from the operator or provide an output to the operator, or may perform both actions. The interface(s) 304 may either be a Command Line Interface (CLI), Graphical User Interface (GUI), voice interface, and/or any other user interface known in the art or to be developed.

The sensor(s) 306 can be one or more smart cameras such as fish-eye cameras mentioned above or any other type of sensor/capturing device that can capture various types of data (e.g., audio/visual data) regarding activities and traffic patterns at the intersection 101. Any one sensor 306 can be located at the intersection 101 and coupled to the traffic controller 106 and/or the traffic light 117.

As mentioned, the sensor(s) 306 may be installed to capture objects moving across the roads. The sensor(s) 306 used may include, but are not limited to, optical sensors such as fish-eye camera mentioned above, Closed Circuit Television (CCTV) camera and Infrared camera. Further, sensor(s) 306 can include, but not limited to induction loops, Light Detection and Ranging (LIDAR), radar/microwave, weather sensors, motion sensors, audio sensors, pneumatic road tubes, magnetic sensors, piezoelectric cable, and weigh-in motion sensor, which may also be used in combination with the optical sensor(s) or alone.

The memory 308 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 308 may include computer-readable instructions, which when executed by the processor 302 cause the light controller 102 to perform dynamic zone creation and modification for adaptive traffic control. The computer-readable instructions stored in the memory 206 can be identified as normal traffic module (service) 310, pedestrian activity module (service) 312 and zone change module (service) 314), the functionalities of which, when executed by the processor 302 will be further described below.

As mentioned above, light controller 102 and traffic controller 106 may form a single physical unit, in which case system components of each, as described with reference to FIGS. 1-3 may be combined into one (e.g., all example modules described above with reference to FIGS. 2 and 3 may be stored on a single memory such as the memory 206 or the memory 308).

While certain components have been shown and described with reference to FIGS. 2 and 3, the components of the light controller 102 and/or the traffic controller 106 are not limited thereto, and can include any other component for proper operations thereof including, but not limited to, a transceiver, a power source, etc.

Figure 4:
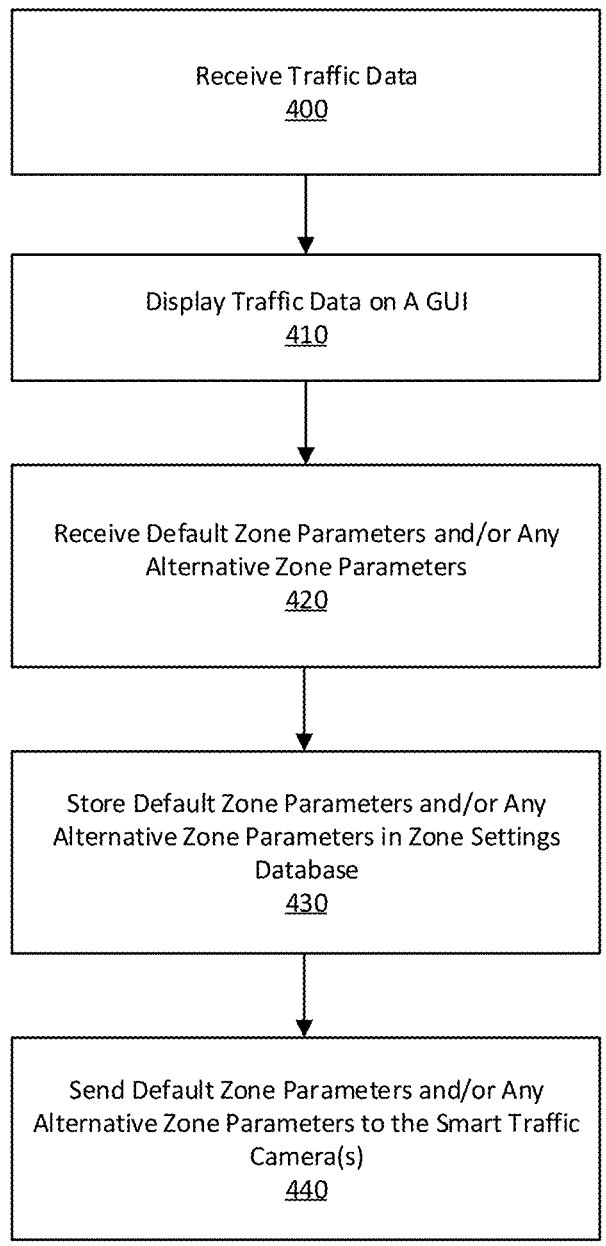
FIG. 4 illustrates a zone identification method.

Having described an example system and example components of one or more elements thereof with reference to FIGS. 1-3, the disclosure now turns to the description of examples for creating and modifying zones for a smart traffic camera installed at an intersection based on pedestrian and vehicular traffic. Initially, a zone identification method will be described FIG. 4 illustrates a zone identification method. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 4 will be described from the perspective of the traffic controller 106. However, it will be understood that the functionalities of the traffic controller 106 are implemented by the processor 202 executing computer-readable instructions for zone setup module 212 stored on the memory 206 described with reference to FIG. 2.

At step 400, the traffic controller 106 may receive traffic data at the intersection 101 captured by smart traffic camera 103 and/or sensor(s) 306 associated therewith. The received traffic data may include an image of the intersection 101 including any objects (moving or still) present therein.

At step 410, the traffic controller 106 may display (output) the received video data on a screen of GUI 116 for a user (e.g., a network operator). In response, the user, using tools made available to the user via GUI 116 may draw (visually) parameters of one or more zones at the intersection 101. Alternatively, the user may provide dimensional information of the one or more zones at the intersection 101 instead of drawing them. The specified parameters by the user may be referred to as default zone parameters.

Figure 5:
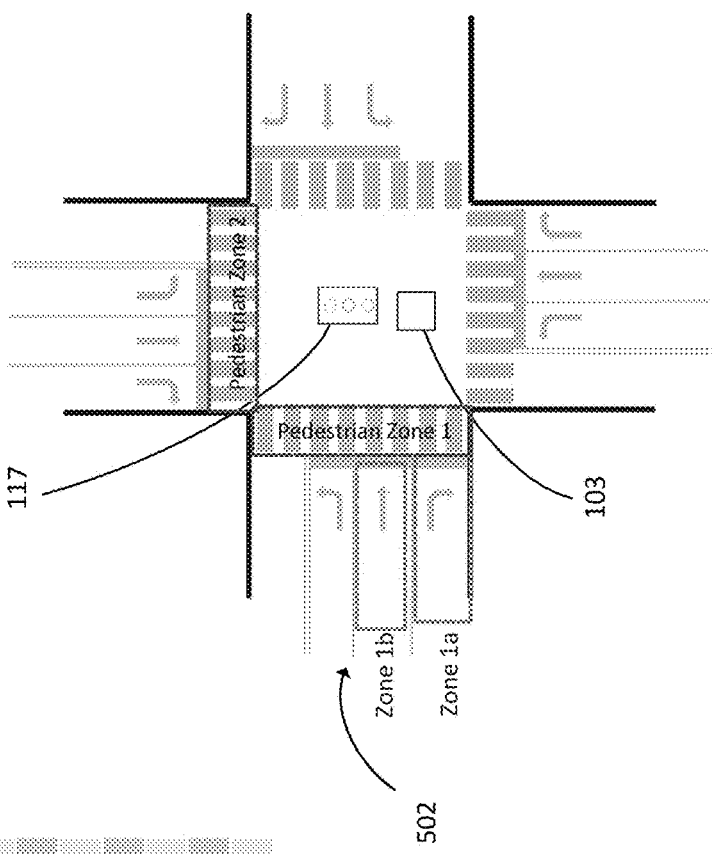
FIG. 5 illustrates an example of default and alternative zone parameters.

Optionally, the user, via the GUI 116, can also specify one or more alternative zone parameters (which can also be referred to as extended zone parameters, per FIG. 5) for the intersection 101. These alternative zone parameters may be used as an alternative to default zone parameters when there is a high correlation between increased pedestrian traffic and increased vehicular traffic, as will be described below with reference to FIGS. 8-10.

Additionally, such alternative zone parameters may have one or more corresponding triggering conditions. For example, the user may enlarge one or more zones in a given direction at the intersection 101 (e.g., on north-south bound direction) during a rush hour period (e.g., daily between 4 PM to 6 PM) or during a scheduled road closure or public event.

At step 420, the traffic controller 106 may receive the default zone parameters and/or any specified alternative zone parameters for the intersection 101 via the GUI 116.

At step 430, the traffic controller 106 may store the specified default zone parameters and/or any alternative zone parameters for the intersection 101 in the zone setting database 108.

Optionally, at step 440, traffic controller 106 can send the default zone parameters and any alternative zone parameters together with corresponding triggering conditions to smart traffic camera 103 for implementation. Alternatively, the smart traffic camera 103 may query the zone settings database for default/alterative zone parameters.

FIG. 5 illustrates an example of default and alternative zone parameters. FIG. 5 illustrates table 500 that includes example zone parameters including each zone's label, coordinates, width and whether the parameters are default parameters or alternative parameters (extended parameters). FIG. 5 further illustrates a visual representation 502 of the intersection 101 and example zone parameters for vehicular zone 1a and vehicular zone 1b for vehicular traffic and pedestrian zone 1 and pedestrian zone 2 for pedestrian traffic. While FIG. 5 illustrates only two examples for vehicular zones and pedestrian zones, the process of FIG. 4 can identify all possible vehicular and pedestrian zones at the intersection 101.

Figure 6:
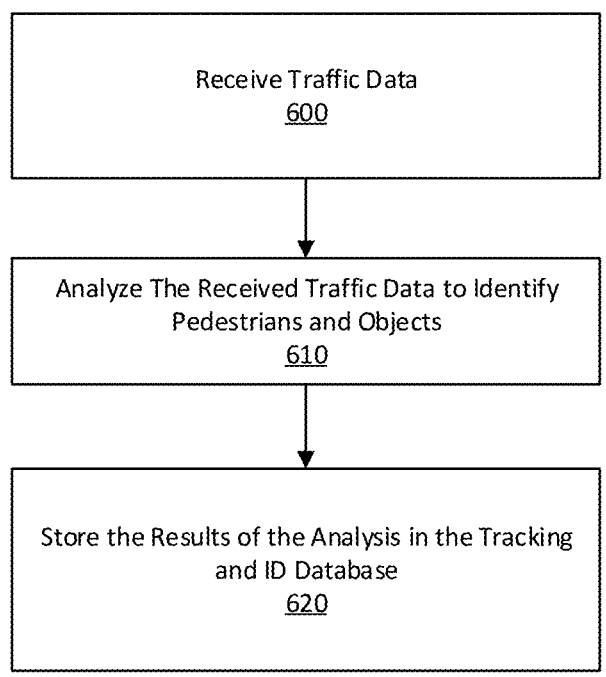
FIG. 6 illustrates a tracking and ID method.

FIG. 6 illustrates a tracking and ID method. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 6 will be described from the perspective of the traffic controller 106. However, it will be understood that the functionalities of the traffic controller 106 are implemented by the processor 202 executing computer-readable instructions stored on the memory 206 described with reference to FIG. 2.

At step 600 and after the default and/or any applicable alternative zone parameters have been applied to the smart traffic camera 103 and/or any applicable ones of the sensors 306, the traffic controller 106 may receive traffic data at the intersection 101 captured by smart traffic camera 103 and/or sensor(s) 306 associated therewith. The received traffic data may include an image of the intersection 101 including any objects (moving or still) present therein.

At step 610, the traffic controller 106 may analyse the traffic data received at step 600. The analysis can be for identification and tracking of objects and pedestrians at the intersection 101, determining pedestrians, pedestrian types (e.g., adults, children, animals, etc.), vehicle and their types, pedestrian and vehicular flow rates at each zone of the intersection 101, location of existing zones of the intersection 101, light phases and timing at the time of data capture by the smart traffic light 103 and/or sensor(s) 306, etc. Objects and vehicles can include any one or more of various types of vehicles, bicycles, motorcycles, autonomous vehicles, etc.

In one example, the traffic controller 106 performs step 610 by implementing computer-readable instructions stored on memory 206 thereof that correspond to the tracking and ID module (service) 208. By execution of computer-readable instructions corresponding to tracking and ID module 208, processor 202 of traffic controller 106 can utilize known or to be developed methods of image/video processing, such as salient point optical flow, for determining and tracking pedestrians, types of pedestrians, vehicles, the types of vehicles, tacking the pedestrians and the objects, etc. Traffic flow rates can also be determined based on the vehicle tracking data according to any known or to be developed method for doing so.

Thereafter, at step 620, the traffic controller 106 stores the results of analysis at step 610 in the tracking and ID database 110. This storing may be in a tabular form, an example of which is described below with reference to FIG. 7.

In one example, the traffic controller may continuously perform the process of FIG. 6 as long as the smart traffic camera 103 and/or any of the sensor(s) 306 are capturing and transmitting data from the intersection 101 back to the traffic controller 106.

In one example and for purposes of resource conservation, the traffic controller 106 may overwrite data stored in the tracking and ID database 110 every predetermined period of time. For example, data may be stored for a period of 7 days and thereafter new data is written over the "old" data starting with the oldest stored data.

FIG. 7 illustrates an example table of data derived from tracking and ID analysis of FIG. 6. As shown in FIG. 7, table 700 includes information on the traffic flow rates and the pedestrian flow rates for each vehicular and pedestrian zone over several time intervals. Duration of the time intervals may be an adjustable parameter determined based on experiments and/or empirical studies. For example, the duration of the time intervals can be 1 minute, 2 minutes, 10 minutes, 30 minutes, an hour, etc.

The above results of tracking and identification of objects and pedestrians at the intersection 101 can be used as training datasets to train a machine learning algorithm that monitors and identifies correlations between pedestrian traffic flow rates and vehicular or object traffic flow rates at the intersection 101 and creates rules that adjust and modify zone parameters for the intersection 101 to perform better recognition and subsequently better traffic control at the intersection 101.

Figure 8:
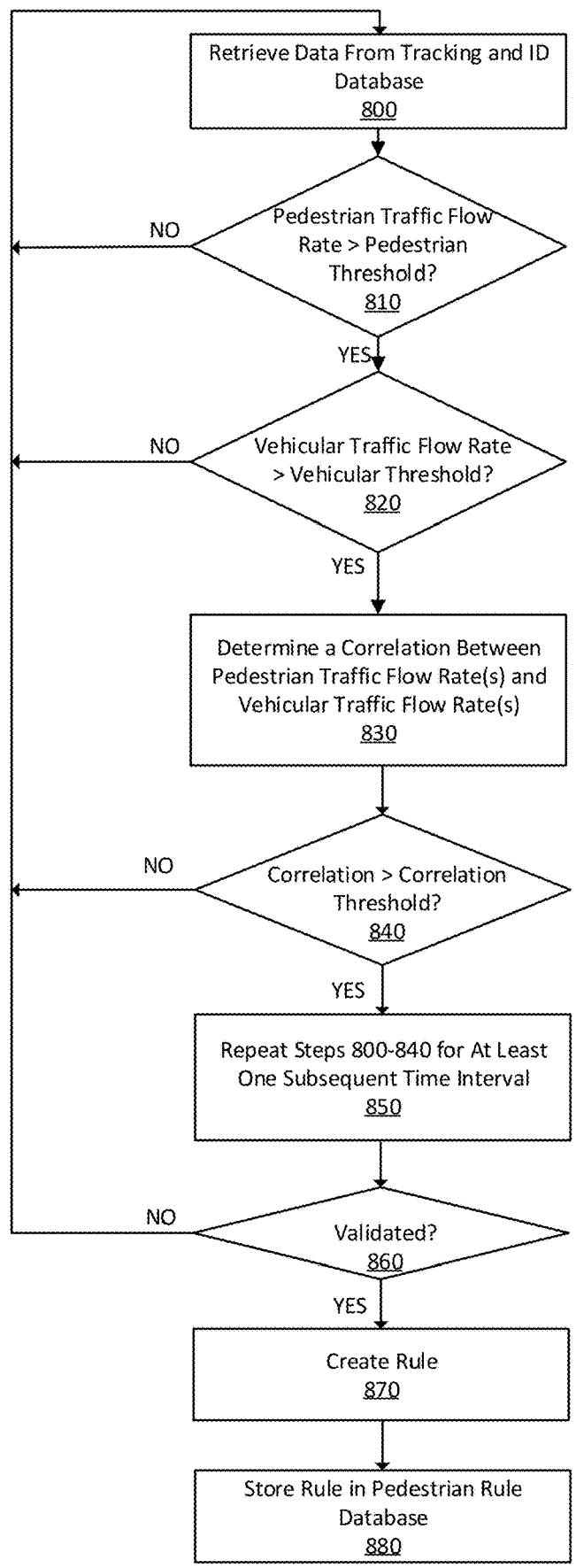
FIG. 8 illustrates a machine-learning based method of creating rules for modifying zone parameters.

FIG. 8 illustrates a machine-learning based method of creating rules for modifying zone parameters. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 8 will be described from the perspective of the traffic controller 106. However, it will be understood that the functionalities of the traffic controller 106 are implemented by the processor 202 executing computer-readable instructions stored on the memory 206 described with reference to FIG. 2.

At step 800, the traffic controller 106 may retrieve stored data from the tracking and ID database 110. For example, the traffic controller 106 can retrieve the stored data for a single time interval (e.g., time interval 1 per table 700 of FIG. 7).

The retrieved data can include information on vehicular and pedestrian traffic flow rates for each vehicular zone and pedestrian zone at the intersection 101.

At step 810, the traffic controller 106 may determine if one or more pedestrian traffic flow rates within the selected time interval is greater than a pedestrian threshold. The pedestrian threshold may be a configurable parameter that may be set based on experiments and/or empirical studies. For example, the pedestrian threshold may be set to 10 individuals (or 10 counts). In other words, at step 810, the traffic controller 106 may determine if there are more than 10 pedestrians in one or more pedestrian zones at the intersection 101.

If there is no pedestrian zone with a pedestrian traffic flow rate that is greater than the pedestrian threshold, the process reverts back to step 800, where steps 800 to 820 are repeated for the next time interval in the table 700. However, if there is at least one pedestrian traffic flow rate that is greater than the pedestrian threshold, then at step 820, the traffic controller 106 may determine if there are one or more vehicular traffic flow rates that are greater than a vehicular threshold. The vehicular threshold may also be a configurable parameter that can be determined based on experiments and/or empirical studies. For example, the vehicular threshold may be set to 10 vehicles per/minute.

If there is no vehicular traffic zone with a corresponding vehicular traffic flow that is greater than the vehicular threshold, the process reverts back to step 800, where steps 800 to 820 are repeated for the next time interval in the table 700.

However, if at step 820, the traffic controller 106 determines that there is at least one vehicular traffic zone with a corresponding vehicular traffic flow rate that is greater than the vehicular threshold, then at step 830, the traffic controller 106 may determine a correlation (a correlation value) between the pedestrian traffic flow rates and vehicular traffic flow rates at the intersection 101. This may be done according to any known or to be developed statistical analyses methods.

At step 840, the traffic controller may determine if the correlation value is greater than a correlation threshold. The correlation threshold may be a configurable parameter determined based on experiments and/or empirical studies. For example, the correlation threshold may be set to have a $R^2$ (R-squared) value of equal to or greater than 0.9, with $R^2$ of 1 being indicative of complete correlation and a $R^2$ value of 0 being indicative of no correlation.

After step 840, the traffic controller may optionally perform steps 850 and 860. Otherwise, the process proceeds to step 870, which will be described below.

At step 850, the traffic controller 106 can repeat steps 800 to 840 for at least one subsequent time interval to validate the correlation. The process of steps 850 is for validating the correlation between the pedestrian traffic flow rate(s) and the vehicular traffic flow rate(s) by repeating steps 800 to 840 for at least one subsequent (consecutive) time interval (e.g., time interval 2 of table 700) and determining whether the correlation value remains above the correlation threshold or not.

Thereafter, at step 860, the traffic controller 106 can determine if step 850 validates the correlation. As noted above, the process of steps 850 and 860 are optional. If not, the process reverts back to step 800 and the traffic controller 106 repeats steps 800 to 860. Otherwise, at step 870, the traffic controller 106 creates a rule (pedestrian rule) for adjusting zone parameters (e.g., default zone parameters) for the zones of the intersection 101. This rule creation can be machine-learning based implemented by executing computer-readable instructions corresponding to learning module 210 stored on the memory 206 of traffic controller 106.

The created rule can be for example to change the default zone parameters for one or more of the vehicular and/or pedestrian zones to one or more corresponding alternative (extended) zone parameters as provided in table 500 of FIG. 5. In another example, the created rule can be based on past manual modifications of zone parameters made under same or similar conditions (e.g., same or similar pedestrian and/or vehicular traffic flow rates).

In another example, the created rule can take factors such as scheduled public events and/or road closures obtained via $3^{rd}$ party database 114 into consideration when determining the pedestrian rule. For example, given that a Sunday outdoor mass is scheduled every Sunday at a church near the intersection 101, which can result in an increase in pedestrian and/or vehicular traffic flow rates, the created rule (that can be machine learned) can enlarge all zone parameters for pedestrian and vehicular zones in the direction of the church to ensure that corresponding pedestrian and/or traffic lights are extended to let the church traffic through and improve pedestrian safety.

Thereafter, the traffic controller 106 can store the created pedestrian rule for adjusting zone parameters in the pedestrian database 112.

Figure 9:
FIG. 9 illustrates an example table of pedestrian rules.

FIG. 9 illustrates an example table of pedestrian rules. Table 900 illustrates several examples of pedestrian rules for modifying zones. For example, for pedestrian traffic flow rates of greater than 10 counts in pedestrian zone 1 and vehicular traffic flow rate of greater than 10 vehicles per minute in vehicular zone 1*a*, the zone setting for pedestrian zone 1 and vehicular zone 1*a* is to be adjusted according to dimension specified by extended zones for pedestrian zone 1 and vehicular zone 1*a* in the table 500 of FIG. 5. In another example, the pedestrian rule can only be based on a pedestrian traffic flow rate exceeding a threshold regardless of the vehicular traffic flow rate.

Examples described with reference to FIGS. 8 and 9 are based on the assumption that a pedestrian rule is created whenever the pedestrian and/or vehicular traffic flow rates exceed their corresponding thresholds. However, the present disclosure is not limited thereto. There can be scenarios where a change in zone parameters is desired when the pedestrian and/or vehicular traffic flow rates are below certain thresholds such that zone parameters need to be reduced for object detection in order to properly adjust the timings of the traffic/pedestrian lights at the intersection 101 during unusually low traffic times. This can be achieved by modifying pedestrian and vehicular thresholds of FIG. 8 and detect flow rates less than such thresholds. In this instance, table 500 can also include specification of dimension of reduced zones (reduced zone parameters) in addition to or instead of extended zones (extended zone parameters).

With a table of default zones and a pedestrian database of pedestrian rules for adjusting zone parameters, as described above, the disclosure now turns to FIG. 10 for describing a process for modifying zone parameters based on real-time changes in pedestrian and/or vehicular traffic flow rates in one or more zones of the intersection 101.

Figure 10:
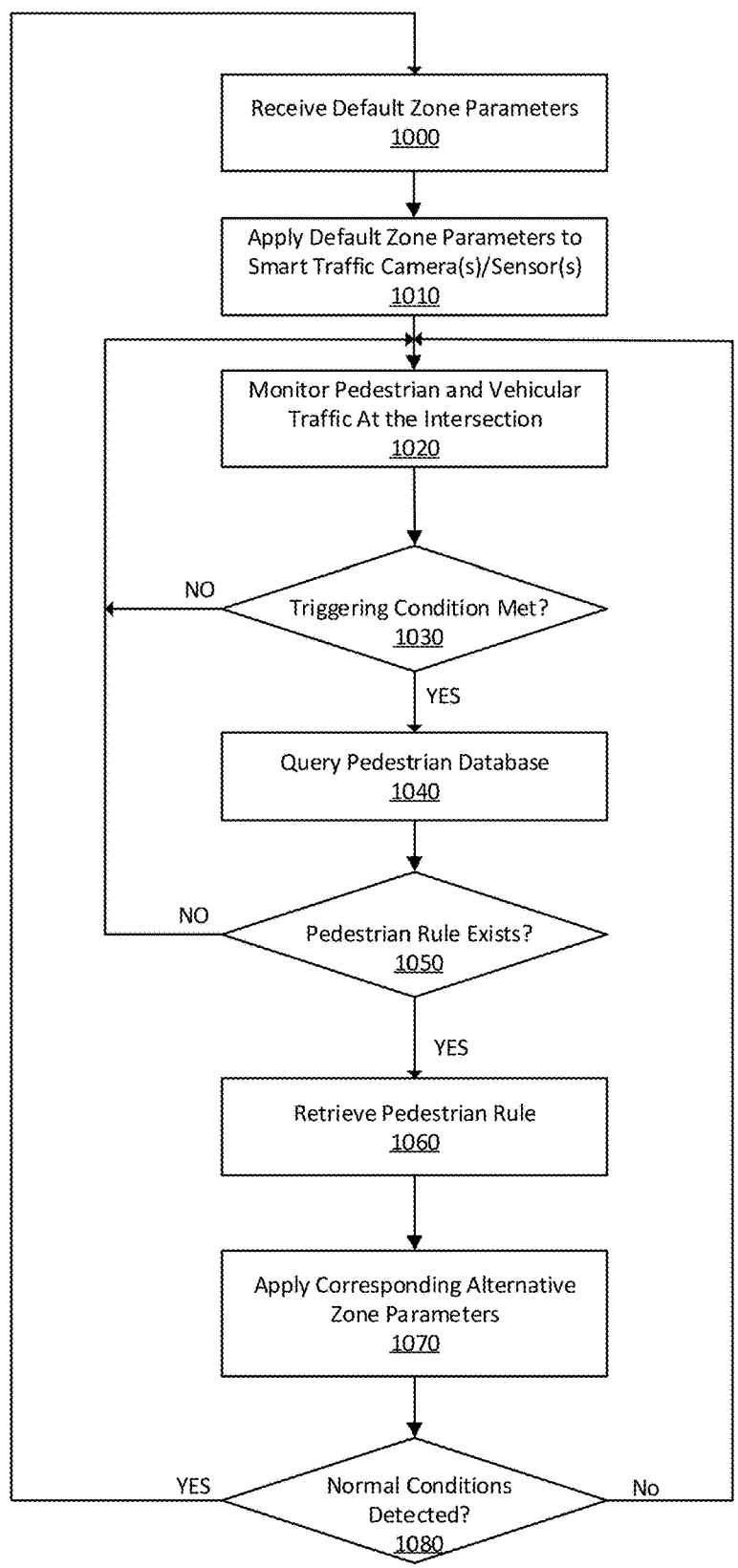
FIG. 10 illustrates an example process for dynamic and real-time modification of zone parameters.

FIG. 10 illustrates an example process for dynamic and real-time modification of zone parameters. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 10 will be described from the perspective of the light controller 102. However, it will be understood that the functionalities of the light controller 102 are implemented by the processor 302 executing computer-readable instructions stored on the memory 308 described with reference to FIG. 3. Alternatively, the process of FIG. 10 can be performed by the traffic controller 106.

At step 1000, the light controller 102 may query the zone setting database 108 to obtain default zone parameters to be implemented at the smart traffic camera(s) 103 (and/or any other applicable one of sensor(s) 306) at the intersection 101. Alternatively, instead of querying the zone setting database 108, at step 1000, the traffic controller may receive the default zone parameters from the zone setting database 108.

At step 1010, the light controller 102 may apply the default zone parameters to the smart traffic camera(s) 103 (and/or any other applicable one of sensor(s) 306) at the intersection 101.

In one example, the light controller 102 implements the steps 1000 and/or 1010 using the computer-readable instructions corresponding to the normal traffic module 310 stored on the memory 308 of the light controller 102.

At step 1020, the light controller 102 may monitor the current pedestrian and vehicular traffic flow rates at the intersection 101. This monitoring may include determining such current pedestrian and vehicular traffic flow rates in the same manner as described above using known image/video processing methods. This monitoring can be for the purpose of determining if a triggering condition is met for querying the pedestrian database 112 for zone modification rules. The triggering condition can be the same as the pedestrian condition and the vehicular thresholds of FIG. 8 or may be slightly different. In any instance, the triggering condition may be a threshold of pedestrian and/or vehicular traffic flow rates above or below which the light controller 102 is triggering to query the pedestrian database 112 for zone modification rules. The triggering condition can include two thresholds (one indicating a threshold value for pedestrian traffic flow rate such as the pedestrian threshold of FIG. 8 and another indicating a value for vehicular traffic flow rate such as the vehicular threshold of FIG. 8).

At step 1030, the light controller 102 can determine if the triggering condition is met. In one example and when the triggering condition includes two thresholds, at step 1030, the light controller 102 determines if both thresholds are met. In another example, the light controller 102 determines if one of the thresholds (e.g., pedestrian threshold) is met.

If at step 1030, the light controller 102 determines that the triggering condition is not met, the process reverts back to step 1020 and the light controller 102 can continuously monitor the pedestrian and vehicular traffic conditions at the intersection 101 until the triggering condition is met. In one example, steps 1020 and 1030 may be performed by implementing computer-readable instructions corresponding to the pedestrian activity module 312 stored on memory 308 of the light controller 102.

However, it at step 1030, the triggering condition is met, then at step 1040, the light controller 102 may query the pedestrian database 112 to see if there is a zone modification rule (Pedestrian rule) (e.g., table 900 of FIG. 9) corresponding to the current pedestrian and/or vehicular traffic flow rates at the intersection 101 as determined at step 1020.

At step 1050, the light controller 102 determines if a pedestrian rule exists or not. If a rule does not exist, the process reverts back to step 1020 and the light controller 102 repeats steps 1020 to 1050. However, if a rule exists, then at step 1060, the light controller 102 can query the zone setting database 108 to retrieve zone modification parameters stored therein and indicated in the pedestrian rule. As described above, rules stored in pedestrian rules database (e.g., Table 900 of FIG. 9) may reference extended/reduced or alternative zone parameters stored in the zone setting database 108 as shown in table 500 of FIG. 5. Accordingly, at step 1060, the light controller 102 may query the zone setting database 108 to retrieve corresponding alternative zone parameters.

At step 1070, the light controller 102 may apply the corresponding alternative (extended or reduced) zone parameters to the smart traffic camera(s) 103 (and/or any other applicable sensor(s) 306) installed at the intersection 101. In one example, steps 1040-1070 may be performed by implementing computer-readable instructions corresponding to the zone change module 314 stored on memory 308 of the light controller 102.

Thereafter, at step 1080, the light controller 102 determines if current pedestrian and/or vehicular traffic flow rates at the intersection 101 has/have returned to normal and if so, the process reverts back to step 1000. If not, the process reverts back to step 1020.

In one example, monitoring and detection of pedestrian traffic flow rate at the intersection 101 using smart traffic cameras such as the smart traffic camera 103 can help improve pedestrian safety at the intersection 101. For example, when a detection of a pedestrian and a correspondingly low pedestrian traffic flow rate during night time, can trigger the light controller 102 to highlight the present few pedestrian(s) using one or more lighting systems installed at the intersection 101 such as the traffic light 117. Accordingly, the present pedestrians can be highlighted for incoming vehicular traffic at the intersection 101 and help reduce accidents and pedestrian related incidents.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method comprising:
applying default zone parameters to define detection zones at one or more sensors installed at an intersection, the detection zones being used by the one or more sensors for monitoring and detecting traffic conditions at the intersection;
determining a current pedestrian traffic flow rate at the intersection;
determining if a triggering condition for adjusting one or more of the default zone parameters, wherein the triggering condition is affected by the current pedestrian traffic flow rate; and
adjusting the one or more of the default zone parameters if the triggering condition is met to dynamically change size or shape of the detection zones, wherein the adjustment of the one or more of the default zone parameters include:
querying a third party database for a plurality of factors to determine a rule using a machine learning algorithm, wherein:
the plurality of factors include pedestrian information, device information associated with the pedestrian information, and event information within a certain distance from the intersection, and
the rule is determined based on correlations between the current pedestrian traffic flow rate and a current vehicular traffic flow rate at the intersection; and
enlarging or reducing the one or more of the default zone parameters based on the rule determined using the plurality of factors from the third party database.

2. The method of claim 1, wherein the default zone parameters are manually specified using a graphical user interface.

3. The method of claim 1, wherein:
the triggering condition includes a pedestrian threshold and a vehicular threshold, and
the triggering condition is met when the current vehicular traffic flow rate is greater than the vehicular threshold and the current pedestrian traffic flow rate is greater than the pedestrian threshold.

4. The method of claim 1, further comprising:
querying a pedestrian database to determine if a pedestrian rule exists if the triggering condition is met, wherein the one or more of the default zone parameters are adjusted in the pedestrian rule exists.

5. The method of claim 4, wherein the pedestrian rule identifies one or more alternative parameters for one or more of the detection zones at the intersection.

6. The method of claim 5, further comprising:
querying a zone setting database to retrieve alternative parameters for adjusting the one or more of the default zone parameters, and
adjusting the one or more of the default zone parameters using the alternative parameters.

7. The method of claim 4, wherein the pedestrian database includes pedestrian rules created using a machine-learning algorithm.

8. A controller comprising:
memory having computer-readable instructions stored therein; and
one or more processors configured to execute the computer-readable instructions to:
apply default zone parameters to define detection zones at one or more sensors installed at an intersection, the detection zones being used by the one or more sensors for monitoring and detecting traffic conditions at the intersection;
determine a current pedestrian traffic flow rate at the intersection;
determine if a triggering condition for adjusting one or more of the default zone parameters, wherein the triggering condition is affected by the current pedestrian traffic flow rate; and
adjust the one or more of the default zone parameters if the triggering condition is met to dynamically change size or shape of the detection zones, wherein the adjustment of the one or more of the default zone parameters include:
query a third party database for a plurality of factors to determine a rule using a machine learning algorithm, wherein:
the plurality of factors include pedestrian information, device information associated with the pedestrian information, and event information within a certain distance from the intersection, and
the rule is determined based on correlations between the current pedestrian traffic flow rate and a current vehicular traffic flow rate at the intersection; and
enlarge or reduce the one or more of the default zone parameters based on the rule determined using the plurality of factors from the third party database.

9. The controller of claim 8, wherein the default zone parameters are manually specified using a graphical user interface.

10. The controller of claim 8, wherein
the triggering condition includes a pedestrian threshold and a vehicular threshold, and
the triggering condition is met when the current vehicular traffic flow rate is greater than the vehicular threshold and the current pedestrian traffic flow rate is greater than the pedestrian threshold.

11. The controller of claim 8, wherein the one or more processors are configured to execute the computer-readable instructions to query a pedestrian database to determine if a pedestrian rule exists if the triggering condition is met, wherein the one or more of the default zone parameters are adjusted in the pedestrian rule exists.

12. The controller of claim 11, wherein the pedestrian rule identifies one or more alternative parameters for one or more of the detection zones at the intersection.

13. The controller of claim 12, wherein the one or more processors are configured to execute the computer-readable instructions to:
query a zone setting database to retrieve alternative parameters for adjusting the one or more of the default zone parameters, and
adjust the one or more of the default zone parameters using the alternative parameters.

14. The controller of claim 11, wherein the pedestrian database includes pedestrian rules created using a machine-learning algorithm.

15. One or more non-transitory computer-readable medium having computer-readable instructions stored therein, which when executed by one or more processors of a controller, configure the controller to:
apply default zone parameters to define detection zones at one or more sensors installed at an intersection, the detection zones being used by the one or more sensors for monitoring and detecting traffic conditions at the intersection;
determine a current pedestrian flow rate at the intersection;
determine a current vehicular traffic flow rate and a current pedestrian traffic flow rate at the intersection;
determine if a triggering condition for adjusting one or more of the default zone parameters, wherein the triggering condition is affected by the current pedestrian traffic flow rate; and
adjust the one or more of the default zone parameters if the triggering condition is met to dynamically change size or shape of the detection zones, wherein the adjustment of the one or more of the default zone parameters include:
query a third party database for a plurality of factors to determine a rule using a machine learning algorithm, wherein:
the plurality of factors include pedestrian information, device information associated with the pedestrian information, and event information within a certain distance from the intersection, and
the rule is determined based on correlations between the current pedestrian traffic flow rate and the current vehicular traffic flow rate at the intersection; and
enlarge or reduce the one or more of the default zone parameters are enlarged based on the rule determined using the plurality of factors from the third party database.

16. The one or more non-transitory computer-readable medium of claim 15, wherein the default zone parameters are manually specified using a graphical user interface.

17. The one or more non-transitory computer-readable medium of claim 15, wherein
the triggering condition includes a pedestrian threshold and a vehicular threshold, and
the triggering condition is met when the current vehicular traffic flow rate is greater than the vehicular threshold and the current pedestrian traffic flow rate is greater than the pedestrian threshold.

18. The one or more non-transitory computer-readable medium of claim 15, wherein the one or more processors are configured to execute the computer-readable instructions to query a pedestrian database to determine if a pedestrian rule exists if the triggering condition is met, wherein the one or more of the default zone parameters are adjusted in the pedestrian rule exists.

19. The one or more non-transitory computer-readable medium of claim 18, wherein the pedestrian rule identifies one or more alternative parameters for one or more of the detection zones at the intersection.

20. The one or more non-transitory computer-readable medium of claim 19, wherein the one or more processors are configured to execute the computer-readable instructions to:
query a zone setting database to retrieve alternative parameters for adjusting the one or more of the default zone parameters, and
adjust the one or more of the default zone parameters using the alternative parameters.

* * * * *